United States Patent
Yan et al.

(10) Patent No.: US 9,077,213 B2
(45) Date of Patent: Jul. 7, 2015

(54) HEAT DISSIPATION FAN AND STATOR THEREOF

(75) Inventors: Jun-Hui Yan, Shenzhen (CN);
Yong-Kang Zhang, Shenzhen (CN);
Yung-Ping Lin, New Taipei (TW)

(73) Assignees: Fu Zhun Precision Industry (Shen Zhen) Co., Ltd., Shenzhen (CN);
Foxconn Technology Co., Ltd., New Taipei (TW)

( * ) Notice: Subject to any disclaimer, the term of this patent is extended or adjusted under 35 U.S.C. 154(b) by 793 days.

(21) Appl. No.: 13/278,099

(22) Filed: Oct. 20, 2011

(65) Prior Publication Data
US 2012/0315168 A1 Dec. 13, 2012

(30) Foreign Application Priority Data
Jun. 8, 2011 (CN) .......................... 2011 1 0152299

(51) Int. Cl.
| | |
|---|---|
| F04D 25/00 | (2006.01) |
| H02K 7/09 | (2006.01) |
| F04D 25/06 | (2006.01) |
| H02K 7/14 | (2006.01) |

(52) U.S. Cl.
CPC .............. *H02K 7/09* (2013.01); *F04D 25/0646* (2013.01); *H02K 7/14* (2013.01); *F04D 25/0633* (2013.01)

(58) Field of Classification Search
CPC ........... H02K 7/125; H02K 7/12; H02K 7/14; H02K 7/09; H02K 1/30; H02K 21/024; H02K 21/026; H02K 21/028; H02K 23/44; F04D 25/0633; F04D 25/0646

USPC ................... 310/216.004, 216.015, 216.016, 310/216.055; 417/423.7
See application file for complete search history.

(56) References Cited

U.S. PATENT DOCUMENTS

| | | | |
|---|---|---|---|
| 6,700,280 B1* | 3/2004 | Geiger et al. ................. | 310/193 |
| 6,817,507 B2* | 11/2004 | Yeon ............................ | 226/188 |
| 7,109,623 B2* | 9/2006 | Wada et al. ................ | 310/156.45 |
| 7,436,625 B1* | 10/2008 | Chiou et al. ................ | 360/98.07 |
| 7,952,252 B2* | 5/2011 | Kang et al. .............. | 310/216.015 |
| 8,067,870 B2* | 11/2011 | Kobayashi et al. ....... | 310/156.05 |
| 8,174,156 B2* | 5/2012 | Nakahara et al. ............... | 310/59 |
| 8,558,426 B2* | 10/2013 | Stiesdal .................... | 310/156.38 |
| 2001/0036416 A1* | 11/2001 | Obara ........................ | 417/423.1 |
| 2005/0067917 A1* | 3/2005 | Kastinger et al. ............. | 310/257 |
| 2007/0013242 A1* | 1/2007 | Tung et al. .................. | 310/67 R |
| 2007/0241628 A1* | 10/2007 | Himmelmann et al. ...... | 310/190 |
| 2010/0033050 A1* | 2/2010 | Kobayashi et al. ........ | 310/156.12 |
| 2012/0315168 A1* | 12/2012 | Yan et al. ................... | 417/423.7 |

* cited by examiner

*Primary Examiner* — Devon Kramer
*Assistant Examiner* — Nathan Zollinger
(74) *Attorney, Agent, or Firm* — Novak Druce Connolly Bove + Quigg LLP

(57) ABSTRACT

An exemplary heat dissipation fan includes a rotor and a stator. The rotor includes a hub, a central shaft extending down from a top end of the hub, the shaft having a free end far from the top end of the hub. A magnetic element attached to an inner periphery of the hub. The stator includes a stator core consisting layers of yokes, two insulation frames mounted at two opposite ends of the stator core and a coil wound around the insulation frames. An outer surface of the stator faces and is spaced from an inner surface of the magnetic element of the rotor with a clearance defined therebetween. A width of a bottom end of the clearance adjacent to the free end of the shaft being smaller than a width of a top end of the clearance.

14 Claims, 4 Drawing Sheets

HEAT DISSIPATION FAN AND STATOR THEREOF

BACKGROUND

1. Technical Field

The disclosure relates to electronic device cooling, and particularly to a heat dissipation fan providing stable rotation of a rotor thereof.

2. Description of the Related Art

With the continuing development of electronics technology, electronic packages such as CPUs (central processing units) employed in electronic devices are generating more and more heat. The heat requires immediate dissipation in order that the CPU and the electronic device can continue to operate stably. A heat dissipation fan is commonly used in combination with a heat sink for cooling the CPU.

A conventional heat dissipation fan includes a stator, and a rotor having a hub with a plurality of blades extending from the hub. The stator establishes an alternating magnetic field interacting with a magnetic field of the rotor to drive the rotor to rotate. Thus the rotation of the blades generates a forced airflow, for cooling the CPU. The stator includes a bearing defining a bearing hole therein. The rotor has a shaft extending into the bearing hole and is thus rotatably supported by the bearing.

However, during rotation of the rotor, the rotating blades generate an external air pressure which pulls the rotor to move upwardly along an axial direction away from the stator. When this happens, the rotor is said to be in a "floating" condition. The floating rotor is inclined to generate noise, which may be annoying or even unacceptable.

What is desired, therefore, is a heat dissipation fan which can overcome the above-described shortcomings.

DETAILED DESCRIPTION

Reference will now be made to the figures to describe an embodiment of the present heat dissipation fan in detail.

Figure 1:
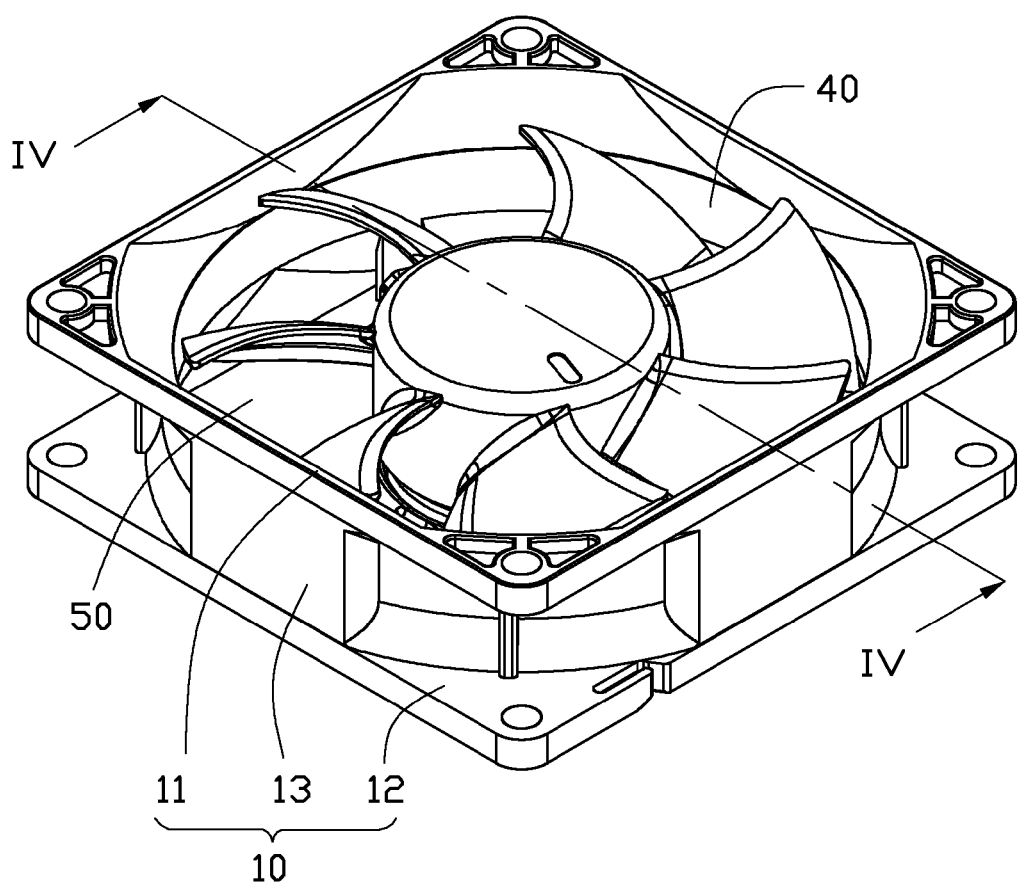
FIG. 1 is an isometric, assembled view of a heat dissipation fan according to an exemplary embodiment of the present disclosure.
Figure 2:
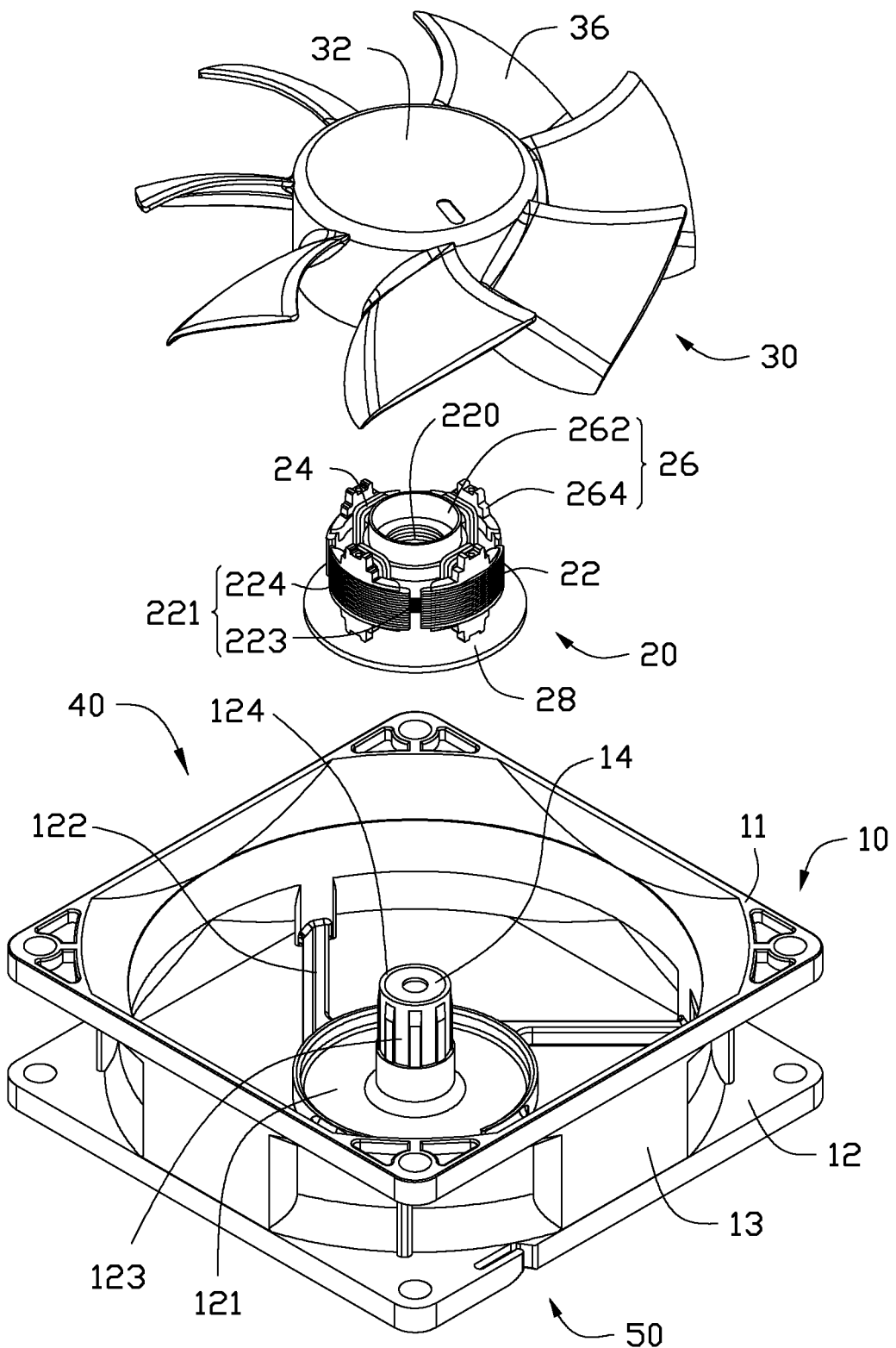
FIG. 2 is an exploded view of the heat dissipation fan of FIG. 1.

Referring to FIGS. 1 and 2, a heat dissipation fan includes a housing 10, a rotor 30 and a stator 20. The rotor 30 is rotatable about the stator 20.

The housing 10 is generally in the form of a hollow rectangular frame, and includes a top wall 11, a bottom wall 12 parallel to and spaced from the top wall 11, and an annular side wall 13 connected between the top wall 11 and the bottom wall 12. An air inlet 40 is defined in a central portion of the top wall 11. An air outlet 50 aligned with the air inlet 40 is defined in a central portion of the bottom wall 12. The housing 10 also includes a base 121 located at a center of the air outlet 50, a central tube 123 extending upward from the base 121, and a plurality of ribs 122 extending radially from an outer periphery of the base 121 to connect an inner periphery of the bottom wall 12. The central tube 123 defines a central hole 124 therein, and thus includes an open top end. The central hole 124 extends along an axial direction of the central tube 123 for receiving a bearing 14 therein.

Figure 3:
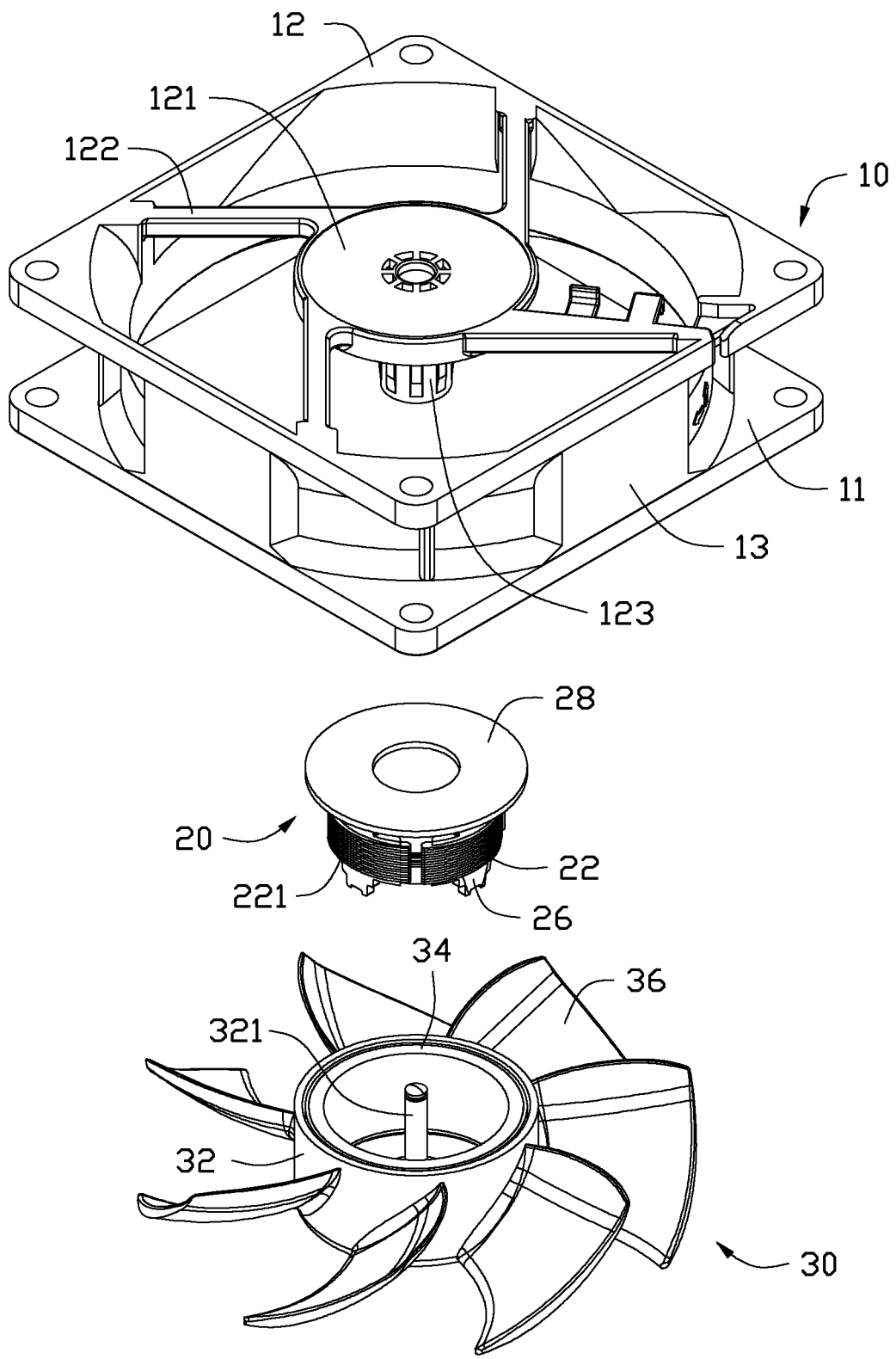
FIG. 3 is similar to FIG. 2, but showing the exploded heat dissipation fan inverted.
Figure 4:
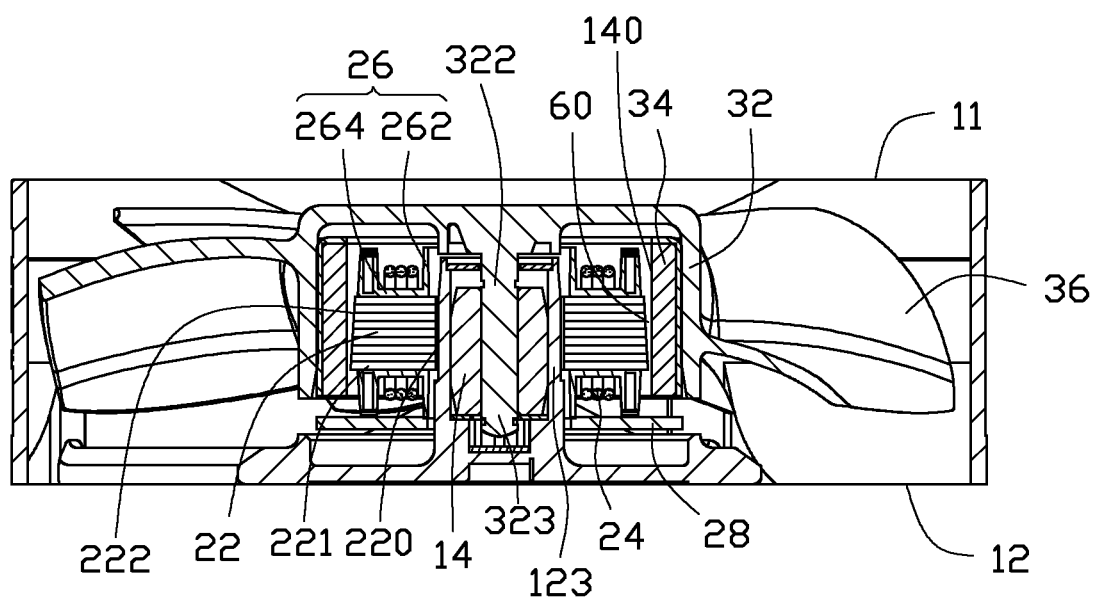
FIG. 4 is a cross-section of the heat dissipation fan of FIG. 1, taken along line IV-IV thereof.

The stator 20 includes a stator core 22, a plurality of coils 24 wound on the stator core 22, a pair of insulation frames 26, and a PCB (printed circuit board) 28 connected to the coils 24 electrically. In this embodiment, there are four coils 24. Referring also to FIGS. 3 and 4, the stator core 22 is made of metallic material, and includes layered yokes 221 stacked along a bottom to top direction thereof. Referring back to FIG. 2, each of the yokes 221 includes an annular plate 223 and a plurality of T-shaped arms 224 extending outwardly from an outer periphery of the annular plate 223. In the present embodiment, there are four arms 224, which are equally spaced from each other along a circumference direction of the annular plate 223. Inner diameters of the annular plates 223 of the yokes 221 are substantially the same. Outer edges of the arms 224 of each yoke 221 are located on a same imaginary circle, which has a common center with the annular plate 223. A diameter of the imaginary circle is a diameter of the yoke 221. The diameters of the yokes 221 are different from each other.

More specifically, the diameters of the yokes 221 gradually decrease from a bottommost yoke 221 to a topmost yoke 221 along a stacking direction thereof. Accordingly, when the yokes 221 are stacked together to form the stator core 22, a cylindrical receiving space 220 is defined in a central portion of the stator core 22 cooperatively by inner edges of the annular plates 223 of the yokes 221; and the outer edges of the arms 224 cooperatively define a tapered (frustoconical) outer surface 222. The receiving space 220 is configured for receiving the central tube 123 therein. A diameter of the tapered outer surface 222 gradually decreases from a bottom end of the stator core 22 to a top end of the stator core 22. That is, an outer size of the stator core 22 decreases gradually along an axial direction from the bottom end to the top end thereof.

The insulation frames 26 are mounted to top and bottom ends of the stator core 22, respectively. Each insulation frame 26 includes an annular portion 262, and a plurality of claws 264 extending outwardly and radially from an outer periphery of the annular portion 262. The annular portion 262 corresponds to the annular plates 223 of the yokes 221, and the claws 264 correspond to the arms 224 of the yokes 221. Thus there are four claws 264, which are equally spaced from each other along a circumference direction of the annular portion 262. The coils 24 wind around the claws 264 of the insulation frames 26 and corresponding portions of the arms 224 to establish an alternating magnetic field in operation of the heat dissipation fan. The insulation frames 26 space the coils 24 from the stator core 22, thereby preventing the coils 24 from coming into electrical contact with the stator core 22. The PCB 28 with electronic components mounted thereon is electrically connected to the coils 24 to control electrical current flowing through the coils 24.

The rotor 30 includes a hub 32 having a shaft 321 extending downward and perpendicularly from a central portion thereof, a plurality of blades 36 extending radially from an outer side of the hub 32, and a magnetic element 34 adhered to an inner side of the hub 32. The shaft 321 has a fixed end 322 connected with the hub 32 and a free end 323 away from the hub 32. The magnetic element 34 is annular shaped (i.e., shaped like a hollow cylinder). An inner diameter of the magnetic element 34 is slightly larger than the largest outer diameter of the stator core 22. An outer diameter of the magnetic element 34 is slightly larger than an inner diameter of the hub 32, such that the magnetic element 34 can be interferentially fitted into the hub 32. The magnetic element 34 can be a permanent magnet, or a magnetizing magnet which is made of non-magnetic material magnetized to create a persistent magnetic field.

When the heat dissipation fan is assembled, the stator 20 is mounted around the central tube 123, with the PCB 28 located on the base 121 of the housing 10. The rotor 30 is positioned over the stator 20, and is assembled to the stator 20 via the shaft 321 being rotatably received in the bearing 14. An inner surface 140 of the magnetic element 34 faces and is spaced from the tapered outer surface 222 of the stator core 22, with a generally annular clearance 60 defined therebetween. A width of the clearance 60 increases along an axial direction from the bottom end of the stator core 22 to the top end of the stator core 22. That is, a distance between the tapered outer surface 222 of the stator core 22 and the inner surface 140 of the magnetic element 34 increases along the axial direction from the bottom end of the stator core 22 to the top end of the stator core 22. Thus, a magnetic attracting force formed between the stator core 22 and the magnetic element 34 increases along the axial direction from the top end of the stator core 22 to the bottom end of the stator core 22.

In this embodiment, along the axial direction of the stator core 22, the distance between the top end of the stator core 22 and the magnetic element 34 is largest, and the distance between the bottom end of the stator core 22 and the magnetic element 34 is smallest, such that the magnetic attracting force formed between the top end of the stator core 22 and the magnetic element 34 is smallest and the magnetic attracting force formed between the bottom end of the stator core 22 and the magnetic element 34 is largest.

During operation of the heat dissipation fan, the rotor 30 is driven to rotate by the interaction of the alternating magnetic field established by the coils 24 of the stator 20 and the magnetic field of the magnetic element 34 of the rotor 30. Thus rotation of the rotor 30 generates a forced airflow for cooling electronic packages, such as CPUs.

Due to the magnetic attracting force formed between the stator core 22 and the magnetic element 34 decreasing along the axial direction from the bottom end of the stator core 22 to the top end of the stator core 22, a larger magnetic attraction force acting on the magnetic element 34 is generated by the bottom end of the stator core 22. When rotation of the rotor 30 generates an external air pressure tending to pull the rotor 30 upwardly along the axial direction thereof, simultaneously, the bottom end of the stator core 22 attracts the magnetic element 34 of the rotor 30 and tends to pull the rotor 30 downwardly along the axial direction thereof. That is, the greater magnetic attraction of the bottom end of the stator core 22 counteracts the effect that the external air pressure would otherwise have on the rotor 30. Thus axially upward movement and floating of the rotor 30 during operation of the heat dissipation fan is avoided, and any problem of noise generated by floating of the rotor 30 is correspondingly avoided.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A heat dissipation fan comprising:
    a rotor comprising:
        a hub, a central shaft extending down from a top end of the hub, the shaft having a free end far from the top end of the hub;
        a plurality of blades extending radially from an outer periphery of the hub; and
        a magnetic element attached to an inner periphery of the hub; and
    a stator to which the rotor is rotatably attached, the stator comprising:
        a stator core comprising a plurality of yokes stacked one on the other;
        two insulation frames mounted at top and bottom ends of the stator core; and
        a plurality of coils each wound around the insulation frames and corresponding portions of the stack of yokes;
    wherein an outer surface of the stator core faces and is spaced from an inner surface of the magnetic element of the rotor with a clearance defined therebetween, a width of a bottom end of the clearance adjacent to the free end of the shaft being smaller than a width of a top end of the clearance;
    wherein each of the yokes comprises an annular plate and a plurality of arms extending outwardly from an outer periphery of the annular plate, outer edges of the arms of each yoke are located on a same imaginary circle which has a common center with the annular plate, and diameters of the imaginary circles of the yokes are different from each other.

2. The heat dissipation fan of claim 1, wherein the width of the clearance gradually decreases from the top end thereof to the bottom end thereof.

3. The heat dissipation fan of claim 1, wherein the stator core has a larger outer size at one end which is adjacent to the free end of the shaft than the other end which is far away from the free end of the shaft.

4. The heat dissipation fan of claim 1, wherein the outer size of the stator core decreases along an axial direction from one end which is adjacent to the free end of the shaft than the other end which is far away from the free end of the shaft.

5. The heat dissipation fan of claim 1, further comprising a housing receiving the rotor and the stator therein, the housing comprising a top wall defining an air inlet therein and a bottom wall defining an air outlet therein, and the air outlet aligned with the air inlet.

6. The heat dissipation fan of claim 5, wherein the stator core comprises one end adjacent to the air inlet and another end adjacent to the air outlet, an outer size of the stator core increasing from the one end to the other end.

7. The heat dissipation fan of claim 1, wherein the outer edges of the arms of the yokes are located at a same imaginary tapered surface which serves as the outer surface of the stator core.

8. A heat dissipation fan comprising:
    a housing comprising:
        a top wall defining an air inlet therein; and
        a bottom wall defining an air outlet therein;
    a rotor received in the housing, the rotor comprising:
        a hub;
        a plurality of blades extending radially from the hub; and
        a magnetic element attached to an inner side of the hub; and
    a stator to which the rotor is rotatably mounted, the stator comprising:

a stator core comprising a plurality of yokes layered one on the other;

two insulation frames mounted at two opposite ends of the stator core; and a plurality of coils each wound around the insulation frames and corresponding portions of the layered yokes;

wherein peripheries of the layered yokes cooperatively define a tapered surface of the stator core, and the tapered surface faces and is spaced from an inner surface of the magnetic element of the rotors;

wherein a clearance is defined between the tapered surface of the stator core and the inner surface of the magnetic element, a width of a first end of the clearance which is adjacent to the air inlet being larger than a width of a second end of the clearance which is adjacent to the air outlet.

9. The heat dissipation fan of claim 8, wherein the width of the clearance gradually decreases from the first end thereof to the second end thereof.

10. The heat dissipation fan of claim 8, wherein the stator core comprises one end adjacent to the air inlet and another end adjacent to the air outlet, an outer size of the one end is smaller than that of the other end.

11. The heat dissipation fan of claim 10, wherein an outer size of the stator core decreases along an axial direction from the other end to the one end.

12. The heat dissipation fan of claim 8, wherein each of the yokes comprises an annular plate and a plurality of arms extending outwardly from an outer periphery of the annular plate, outer edges of the arms of each yoke are located on a same imaginary circle which has a common center with the annular plate, and diameters of the imaginary circles of the yokes are different from each other.

13. The heat dissipation fan of claim 12, wherein the outer edges of the arms of the yokes constitute the tapered surface.

14. The heat dissipation fan of claim 8, wherein the magnetic element is interferentially received in the hub.

\* \* \* \* \*